A. SCHROEDER.
TOWING AND STEERING DEVICE.
APPLICATION FILED NOV. 6, 1915.
1,221,608.
Patented Apr. 3, 1917.
2 SHEETS—SHEET 1.
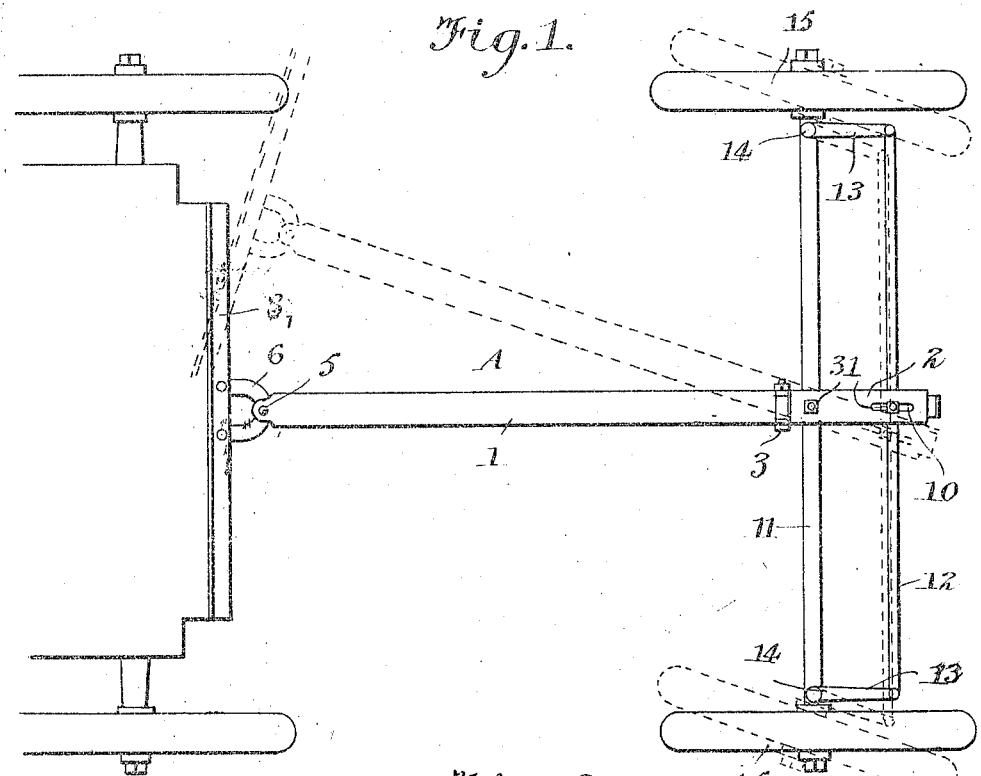
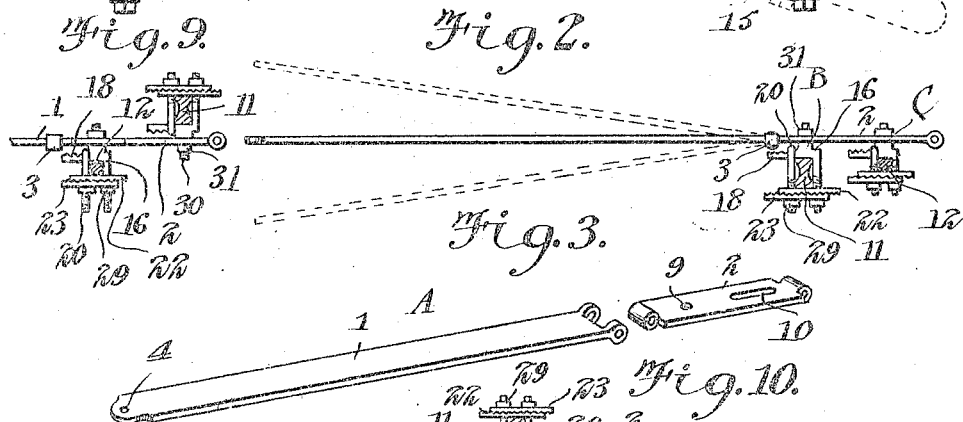
Witnesses
Frederick W. Ely.
R. M. Smith.
Inventor
A. Schroeder.
By Victor J. Evans
Attorney A. SCHROEDER.
TOWING AND STEERING DEVICE.
APPLICATION FILED NOV. 6, 1915.
1,221,608.
Patented Apr. 3, 1917.
2 SHEETS—SHEET 2.
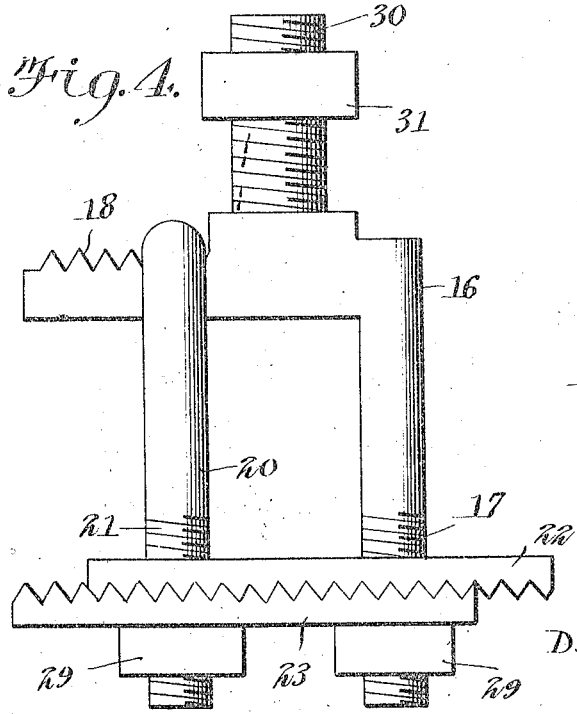
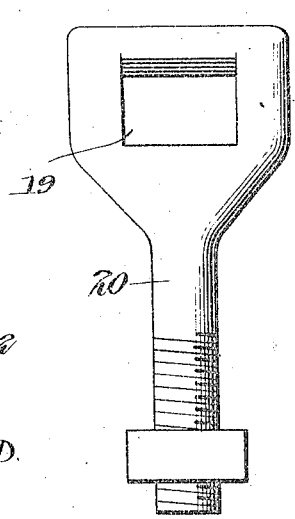
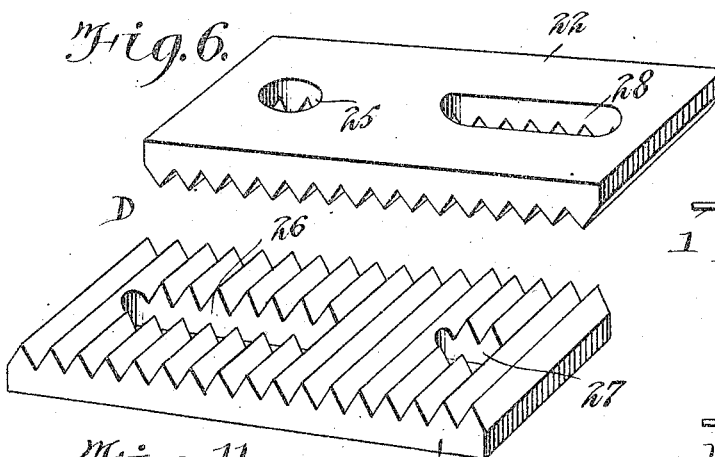
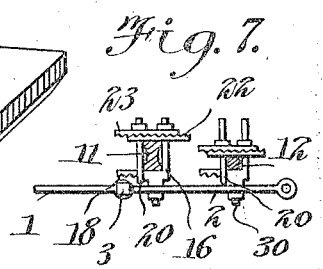
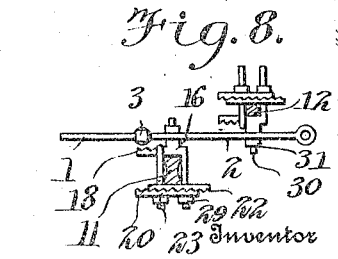
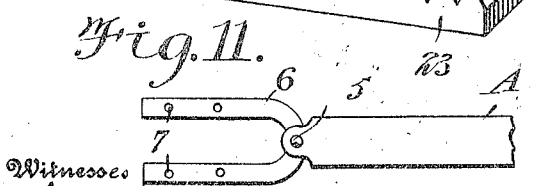
Witnesses
Frederick W. Ely
P.M. Smith
Inventor
A. Schroeder.
By Victor J. Evans
Attorney

UNITED STATES PATENT OFFICE.

ALBERT SCHROEDER, OF HURON, SOUTH DAKOTA.

TOWING AND STEERING DEVICE.

1,221,608.    Specification of Letters Patent.    Patented Apr. 3, 1917.

Application filed November 6, 1915. Serial No. 60,059.

*To all whom it may concern:*

Be it known that I, ALBERT SCHROEDER, a citizen of the United States, residing at Huron, in the county of Beadle and State of South Dakota, have invented new and useful Improvements in Towing and Steering Devices, of which the following is a specification.

This invention relates to towing and steering devices for automobiles, motor trucks and the like, the object in view being to provide a device of a certain character which is adapted to supplant the ordinary and unsatisfactory tow rope now commonly employed by one automobile or motor truck in towing another, the invention being also well adapted for use in connection with a trailing vehicle used as an adjunct to an automobile or motor truck for carrying provisions, merchandise and the like.

With the above and other objects in view, the invention consists in the novel construction, combination and arrangement of parts, as herein described, illustrated and claimed.

In the accompanying drawings:—

Figure 1 is a plan view showing the towing and steering device of this invention applied to the rear of the towing machine and the front of the machine being towed, only sufficient portions of the machines being indicated to illustrate the nature and use of the towing and steering device.

Fig. 2 is a side elevation of the same.

Fig. 3 is a detail perspective view of the sectional draw bar.

Fig. 4 is a side elevation of one of the clamps.

Fig. 5 is a side view of the eye bolt of the clamp.

Fig. 6 is a detailed perspective view of the serrated sections of the bridge of the clamp.

Figs. 7, 8, 9 and 10 are edge views illustrating different methods of attaching the towing and steering device in relation to the axle and tie rod of the trailing machine.

Fig. 11 is a detail view of the clevis.

The towing and steering device contemplated in this invention comprises as the main element thereof a sectional draw bar designated generally at A, 1 designating the main section of said bar and 2 a relatively short section which is hingedly connected to the main section A by means of a horizontal bolt 3 which admits of an up and down movement of the main section 1 as indicated by dotted lines in Fig. 2 to provide for inequalities in the road surface over which the towing machine and the trailing machine are moving. The bolt 3 is detachable by moving the nut thereof so as to enable the rear section 2 of the draw bar to be disconnected from the main section 1 and reversed or turned end for end for a purpose which will presently appear.

At its forward extremity the main section 1 of the draw bar is provided with a hole 4 by means of which the draw bar is pivotally connected by means of a bolt or pin 5 to a U-shaped clevis 6 formed with holes 7 by means of which it may be attached directly to the rear of the towing machine or fastened to a cross bar 8 of angle iron or other shape and of sufficient length to enable the opposite extremities thereof to be fastened to the frame or rear springs of an automobile. These two methods of fastening the draw bar A to the towing machine enable the device to be used in connection with any of the present day types of automobile and motor trucks.

The rear section 2 of the draw bar is provided adjacent to one end with a hole 9 and is also formed with a longitudinal slot 10 and as above indicated, the section 2 may be turned end for end so as to present the slot 10 either toward the front or rear of the device for a purpose which will appear. On the front axle 11 of the trailing machine there is mounted a clip B and on the tie bar 12 connecting the arms 13 of the steering knuckles 14 of the front wheels 15 of the trailing machine is fastened another clip C. The clips B and C are both identical with each other except in size, one of said clips being illustrated in detail in Figs. 4, 5 and 6 wherein it will be observed that said clip or clamp comprises an L-shaped main section 16 one arm of which is threaded as at 17 and the other arm of which is provided with a serrated face 18 which passes through the eye 19 of a bolt 20 threaded at 21. The bolt 20 extends parallel to the arm 17 as shown in Fig. 4 and both of said parts are inserted through a bridge designated generally at D and comprising the two sections 22 and 23 the abutting faces of which are serrated as shown at 24 to prevent relative longitudinal slipping of the same. The section 22 is formed with a bolt hole 25 which lies opposite a slot 26 in the section 23. The section 23 is provided with a bolt hole 27 which lies opposite a longitudinal slot 28 in the section 22. The holes and slots referred to in the sections 22 and 23 of the bridge D provide for a relative adjustment of the sections of the bridge in order that greater or less space may be provided for between the members 17 and 20. Nuts 29 are threaded on the bolts 17 and 20 to provide for a variation in the distance between the main body of the clip or clamp and the bridge D. Each clip or clamp is further provided with a projecting pin or journal 30 on which is threaded a nut 31.

A clip of the character just described is fixedly secured to the axle 11 and another clip is fixedly secured to the tie rod 12. The pin or journal 30 of one clip is inserted through the hole 9 of the draw bar while the pin or journal 30 of the other clip is inserted through the slot 10. Under the arrangement shown in Fig. 1, the slot 10 is arranged in rear of the axle 11 so as to engage the rear clip or clamp and allow for the slight fore and aft movement of the tie rod 12 toward and away from the axle 11 as indicated by dotted lines in Fig. 1, when the draw bar is swung to one side or the other as also indicated in the same figure. Therefore, as the towing vehicle steers to one side or the other, the steering mechanism of the trailing machine is correspondingly affected thereby causing the trailing vehicle to track behind the towing vehicle. This does away with the necessity of providing an extra man to steer the trailing machine as is now commonly done.

In Figs. 7 to 10, inclusive, I have illustrated the adaptability of the draw bar to different types of machines and steering gear. In Fig. 7 the shorter section 2 of the draw bar is shown as passing under the axle 11 and also under the tie rod 12 whereas in Fig. 8 the draw bar section 2 passes over the axle 11 and under the tie rod 12. Fig. 9 illustrates the tie rod 12 as being located in advance of the axle 11, which is the case in some types of machines, the draw bar section 2 passing under the axle 11 and over the tie rod 12. Fig. 10 illustrates the draw bar section 2 as passing under the axle 11 and over the tie bar 12. Any of these combinations may be obtained by the device forming the subject matter of this invention.

The device hereinabove described does away with the unsatisfactory tow rope or cable now commonly employed and provides a device which will be found to be more satisfactory for the purpose of enabling one machine to tow another. Furthermore, the device acts to control the steering gear of the trailing vehicle thereby dispensing with the services of a driver for the trailing machine. The device is also useful for hitching a trailer behind an automobile or motor truck which trailer is to be used for the purpose of carrying merchandise, produce and other material. The trailer may be of the two wheel or four wheel type and by providing said trailer with the conventional automobile steering gear and front axle, said trailer will be caused to track behind the towing vehicle, requiring no attention whatever on the part of the driver in the towing vehicle.

Having thus described my invention, I claim:—

A towing and steering device of the class described comprising a draw bar embodying sections arranged in longitudinal alinement with each other, a horizontal pivot bolt pivotally connecting said sections together, one of said sections being provided adjacent to one end with a hole and also provided with a longitudinal slot, a clip adapted to be secured in fixed relation to the front axle of a trailing vehicle and having a journal fitting the hole in the draw bar, and another clip adapted to be fixedly secured to the tie rod of the steering gear of the trailing vehicle and having a journal receivable in the slot of the draw bar, the shorter section of the draw bar being formed at both ends with a knuckle to receive said pivot bolt and render said section reversible end for end, for the purpose specified.

In testimony whereof I affix my signature in presence of two witnesses.

ALBERT SCHROEDER.

Witnesses:
R. B. HILL,
JOHN S. PYLE.